United States Patent [19]

Marteness

[11] Patent Number: 4,777,084

[45] Date of Patent: Oct. 11, 1988

[54] PHENOLIC-MODIFIED EPOXY ADHESIVE INCLUDING THE REACTION PRODUCT OF BISPHENOL A AND THE MONOGLYCIDYL ETHER OF BISPHENOL A

[75] Inventor: Bruce A. Marteness, Cottage Grove, Minn.

[73] Assignee: Minnesota Mining and Manufacturing Company, St. Paul, Minn.

[21] Appl. No.: 106,727

[22] Filed: Oct. 8, 1987

[51] Int. Cl.$^4$ .............................................. C08G 59/62
[52] U.S. Cl. ................................... 428/272; 428/273; 428/290; 523/466; 523/468; 525/423; 528/94; 528/104; 528/103
[58] Field of Search ................ 528/94, 104, 103; 428/272, 273, 290; 523/466, 468; 525/423

[56] References Cited

U.S. PATENT DOCUMENTS

| | | | |
|---|---|---|---|
| 3,519,576 | 7/1970 | Johnson | 260/2 |
| 3,520,905 | 7/1970 | Johnson | 260/345.2 |
| 3,632,836 | 1/1972 | Walker | 528/103 |
| 3,884,992 | 5/1975 | Shimizu et al. | 260/837 |
| 4,311,661 | 1/1982 | Palmer | 264/510 |
| 4,594,291 | 6/1986 | Bertram et al. | 428/414 |
| 4,659,779 | 4/1987 | Bagga et al. | 525/118 |

FOREIGN PATENT DOCUMENTS 57-018551 4/1982 Japan .
60-028425 2/1985 Japan .

*Primary Examiner*—Earl Nielsen
*Assistant Examiner*—Frederick Krass
*Attorney, Agent, or Firm*—Donald M. Sell; Richard E. Brink

[57] ABSTRACT

Viscous oligomeric epoxy resins can be quickly cured at temperatures of 100° C. by incorporating a hardener that is a blend of (a) the oligomeric reaction product of bisphenol A and bisphenol A monoglycidyl ether and (b) an imidazole. The cured resins are tough and resistant to both moisture and high temperatures. Prepregs, in which glass, graphite or polymeric organic fiber sheets are saturated with these resins, are particularly useful in the repair of damaged aircraft and aerospace structures.

20 Claims, No Drawings

PHENOLIC-MODIFIED EPOXY ADHESIVE INCLUDING THE REACTION PRODUCT OF BISPHENOL A AND THE MONOGLYCIDYL ETHER OF BISPHENOL A

BACKGROUND OF THE INVENTION

This invention relates to novel epoxy adhesive compositions, to fiber-reinforced composites incorporating such adhesives, and to cured composites.

Epoxy resins have been known for several decades and are widely used industrially. These resins are readily crosslinked, or cured, with a wide variety of "hardeners," accelerators often being added to increase the rate of reaction. When reinforced with fibers, especially glass or graphite fibers, these resins form lightweight construction materials that are often employed in the manufacture of sports equipment or in the aeronautic and aerospace industries. In preparing fiber-reinforced products of this type, it is common to saturate a sheet, web, or fabric of fibers (e.g., nonwoven, stitch-bonded, knit, woven, or aligned filaments) with a viscous epoxy resin containing a suitable curing system, thereby forming what is known as a "prepreg," which is subsequently shaped to the desired contours and heated to cure the resin.

A common use for prepregs is in the repair of thermoset or thermoplastic laminates, including failed bonds between thermoset and thermoplastic surfaces. One particularly demanding use is in the repair of aircraft structures, e.g., those in which a reinforcing and supporting "honeycomb" core is covered with a thin skin; cf., e.g., U.S. Pat. No. 4,311,661. Since such repairs must often be carried out on contaminated surfaces in inhospitable environments that may be hot, humid, cold, or dusty, field personnel have listed a number of features that prepregs should possess. For example, the resin should be completely curable within two hours and, since the damaged substrate may contain moisture, the curing temperature should be below 100° C., reducing the possibility of generating steam that might weaken, or even destroy, the repaired section. Because refrigerated storage facilities may not be available, it is important for the prepreg to have a shelf life of at least a year at room temperature (20°-25° C.). Prior to the present invention, no epoxy resin composition has been able to meet these criteria.

U.S. Pat. No. 4,594,291 discloses a curable epoxy resin composition employing, among other things, a sulfanilamide curing agent, and a tetrabutyl phosphonium acetate-acetic acid catalyst. This composition which is cured at temperatures above 140° C., has inadequate room temperature shelf life and lacks toughness.

Japanese Patent Publication No. 57-018551 discloses a curable epoxy adhesive comprised of a poly(para-hydroxystyrene) extender polymer and an undisclosed cure accelerator. The cured adhesive exhibits improved heat, alkali, and chemcial resistance but does not cure at low temperature and has inadequate shelf life.

Japanese Patent Publication No. 60-028425 discloses an epoxy resin composition containing a para-tertiarybutyl phenol polymer extender, dicyandiamide as a hardener, and dichlorophenyl-1,1 dimethyl urea as a cure accelerator. This system is readily workable and cures at low temperature but lacks sufficient shelf life. The cured resin is not sufficiently resistant to moisture, especially at elevated temperatures.

U.S. Pat. No. 4,659,779 discloses solid solutions of imidazole cure accelerators dissolved in poly(para-hydroxystyrene) polymer that are capable of producing curable epoxy adhesives with adequate shelf lives. None of the cured epoxy adhesives in the examples possesses the desired properties previously specified.

European Patent Publication No. 165,230 discloses an epoxy adhesive that uses boron trifluoride complex as a catalyst. This composition is easy to work with and cures at low temperatures but lacks adequate shelf life. The cured resin also lacks the desired properties previously specified.

U.S. Pat. Nos. 3,519,576 and 3,520,905 describe latent curing agents for epoxy resins comprised of amine phenolate salts that provide adequate shelf life and cure at temperatures below 100° C. but the cured resin compositions lack the requisite physical properties.

U.S. Pat. No. 3,884,992 discloses curable epoxy compositions employing poly(para-hydroxystyrene) polymer as an extender. The cured compositions have good heat resistance but are deficient in the other desired physical and mechanical properties.

BRIEF SUMMARY

The present invention provides a remarkably simple epoxy composition that has a shelf life of at least a year at room temperature but can be cured in less than two hours at a temperature below the boiling point of water. This adhesive is particularly useful in the preparation of prepregs that meet the desiderata listed hereinabove.

In its simplest expression, the invention may be defined as a heat-curable epoxy resin adhesive having excellent shelf life at 20° C. and comprising a blend of (a) 100 parts by weight of a viscous epoxy resin that is the oligomeric reaction product of bisphenol A and epichlorohydrin, preferably having an epoxy equivalent weight of 170–180, (b) 30 to 120 (preferably 60–120 and more preferably 70–90) parts by weight of a hardener that is the reaction product of bisphenol A and the monoglycidyl ether of bisphenol A, and (c) 0.1–5% (preferably 1–2%), based on (a)+(b), of an imidazole reactie hardener and latent cure accelerator. This adhesive not only permits the easy removal of any entrapped air but also cures rapidly at temperatures below 100° C., thus minimizing undesirable effects caused by generation of steam from entrapped water in the structure being repaired. After cure, the adhesive is extremely tough and resists deterioration of its mechanical properties upon exposure to high temperatures and humidities. Compositions containing less than 50 parts hardener per 100 parts epoxy resin have poor workability and decreased shelf life. Further, the cured adhesive is brittle, although it may be useful in tooling resin applications.

In a preferred embodiment of the invention, the adhesive is incorporated in a prepreg comprising one or more sheets of fibers, especially glass or graphite fibers in the form of a tow, woven fabric, etc. In some cases, e.g., where cost, fatigue resistance, or impact resistance are critical, polymeric organic fibers may be preferred.

DETAILED DESCRIPTION

Understanding of the invention will be enhanced by referring to the following illustrative but non-limiting examples, in which all parts and percentages are by weight unless otherwise noted.

EXAMPLE 1

To a kettle provided with a high shear mixer, as well as heating and cooling equipment was charged 100 parts of a viscous bisphenol A-epichlorohydrin epoxy resin having an epoxy equivalent weight of about 176 (commercially available from Dow Chemical Company under the trade designation "DER 332"). The resin was heated to about 110° C., at which time there was added 80 parts of a hardener that is the combination of (a) 78.4 parts of the reaction product of bisphenol A and the monoglycidyl ether of bisphenol A and (b) 1.6 parts of 2-methyl imidazole (this hardener being commercially available from Dow Chemical Company under the trade designation "DEH 84"). The addition of the hardener lowered the temperature of the kettle contents to about 70° C., at which temperature mixing was continued until the hardener had fully dissolved. The resultant blend, which was stable for one year at 23° C., gelled in 8–10 minutes when placed on a platen heated to 96° C. and in 30–40 seconds when placed on a platen heated to 150° C. When cured at 96° C., the resin had a glass transition temperature (Tg) of 128° C.

The reaction product of bisphenol A and the monoglycidyl ether of bisphenol A is a mixture of low molecular weight oligomers, and is believed to consist essentially of 1–4 moles of reacted bisphenol A monoglycidyl ether and one mole of reacted bisphenol A. If Example 1 is repeated, replacing the "DEH 84" hardener with a blend of bisphenol A and 2-methyl imidazole, thereby creating a curable epoxy closely resembling that disclosed in U.S. Pat. No. 4,594,291, the resulting product is more reactive and hence more difficult to work with; the cured resin is brittle and lacks the toughness required for many uses.

EXAMPLE 2

Example 1 was repeated, reducing the amount of hardener to 70 parts. The resulting resin blend had a gel time of 6–7 minutes at 96° C. and 20–30 seconds at 150° C. When the resin was cured at 96° C., its Tg was 130° C.

EXAMPLE 3

Example 1 was repeated, increasing the amount of hardener to 90 parts. The resulting resin blend had a gel time of 13–14 minutes at 96° C. and 45–55 seconds at 150° C. When the resin was cured at 96° C., its Tg was 117° C.

The preceding three examples illustrate the unexpected phenomenon that increasing the amount of hardener slows the rate of cure. The hardener employed in these three examples is said by Dow to differ from "previous hardeners, which were usually selected from a variety of chemicals used in other applications," whereas this hardener was "developed for the sole purpose of cross linking epoxy powder coatings." The use of this hardener with liquid epoxy compositions, which was thus contraindicated, has produced unexpected results.

EXAMPLE 4

Example 1 was repeated, substituting, for the "DEH 84" hardener, 80 parts of a hardener that was solely the reaction product of bisphenol A and the monoglycidyl ether of bisphenol A ("DEH 85," also commercially available from Dow Chemical Company). After the hardener had fully dissolved, the temperature was lowered to about 60° C. and 1.8 parts 1-methyl imidazole was added and stirring continued until it had dissolved. The resulting resin blend had a gel time of 6.5–7.5 minutes at 110° C. and a Tg of 124° C.

EXAMPLE 5

Example 4 was repeated, reducing the amount of 1-methyl imidazole to 0.9 part. The resulting resin had a gel time of 13–14 minutes at 110° C., and its Tg was 119° C.

EXAMPLE 6

Example 4 was repeated, increasing the amount of 1-methyl imidazole to 3.6 parts. The resulting resin had a gel time of 3.5–4.5 minutes at 110° C., and its Tg was 130° C.

EXAMPLE 7

Example 5 was repeated, decreasing the amount of "DEH 85"hardener to 70 parts. The resulting resin had a gel time of 14–16 minutes at 110° C., and its Tg was 119° C.

EXAMPLE 8

Example 4 was repeated, decreasing the amount of "DEH 85" hardener to 70 parts. The resulting resin had a gel time of 8.5–9.5 minues at 110° C., and its Tg was 126° C.

EXAMPLE 9

Example 6 was repeated, decreasing the amount of "DEH 85" hardener to 70 parts. The resulting resin had a gel time of 4–5 minutes at 110° C., and its Tg was 136° C.

EXAMPLE 10

Example 5 was repeated, increasing the amount of "DEH 85" hardener to 90 parts. The resulting resin had a gel time of 12–13 minutes at 110° C., and its Tg was 113° C.

EXAMPLE 11

Example 4 was repeated, increasing the amount of "DEH 85" hardener to 90 parts. The resulting resin had a gel time of 5.5–6.5 minutes at 110° C., and its Tg was 119° C.

EXAMPLE 12

Example 6 was repeated, increasing the amount of "DEH 85" hardener to 90 parts. The resulting resin had a gel time of 2.5–3.5 minutes at 110° C., and its Tg was 119° C.

In those few applications where it is not essential for the resin to be cured at a relatively low temperature, the shelf life can be increased; Example 13 describes a resin system of this type.

EXAMPLE 13

Example 5 was repeated, substituting 7.2 parts nickel chloride imidazole for the 1-methyl imidazole. The resulting resin, which had gel time of 14–15 minutes at 110° C., had a Tg of 119° C. This imidazole is "blocked" so that it does not function until the temperature is high enough to cause it to dissociate.

Where it is important to provide a resin system that, when cured, can withstand even higher service temperatures than that of the preceding examples, modifications of the type described in Example 14 may be desirable.

EXAMPLE 14

To the same type of kettle employed in the preceding examples was charged 66 parts of the "DER 332" epoxy resin. The temperature was raised to about 125° C., and, while stirring, 34 parts methyl-fluorene high temperature epoxy resin (cf. copending U.S. Pat. App. Ser. No. 939,574) was added, reducing the temperature to about 110° C. Next, 70 parts of "DEH 85" hardener was dissovled in the blend, and the temperature was then decreased to about 65° C., at which time 1.7 parts 2-methyl imidazole was dissolved in the blend. The resulting resin had a gel time of 16–17 minutes at 110° C., and its Tg was 145° C.

EXAMPLE 15

The resin composition of Example 1 was warmed to about 65° C. and, using a heated knife, coated on a silicone-treated paper release liner at a coating weight of about 71 g/m². Using a heated roll laminator (e.g., of the type available from California Graphite Company Inc. under the trade designation "GM-2450"), a beam of glass fiber strands, weighing about 150 g/m² (commercially available from Owens-Corning under the trade designation "OCF S29"), was then laminated to the resin coating, which effectively saturated it, forming a prepreg. A laminate was then formed by superposing 12 plies of the prepreg, placing them in a vacuum bag and subjecting them to approximately 1 Torr pressure (full vacuum) at ambient temperature for about 30 minutes. Temperature of the layup was then gradually increased, at about 2° C./minute, until 96° C. had been attained; the layup was held at this temperature for 2 hours, after which it was cooled to less than 65° C., the vacuum released, and the vacuum bag removed.

The cured product of this Example 15 was then subjected to a series of tests, with results as shown below:

| 0° tensile strength | 1660 MPa |
| 0° tensile modulus | 51.6 GPa |
| Elongation at break | 3.2% |
| Short beam shear (ASTM Test D2344) | |
| 23° C., dry | 64.9 MPa |
| 23° C., wet | 58.0 MPa |
| 82° C., dry | 59.3 MPa |
| 82° C., wet | 35.9 MPa |
| 93° C., dry | 43.5 MPa |
| 93° C., wet | 38.0 MPa |
| 0° flex strength (ASTM Test D-3039) | |
| 23° C., dry | 1,260 MPa |
| 82° C., dry | 1,032 MPa |
| 82° C., wet | 752 MPa |
| 93° C., dry | 856 MPa |
| 93° C., wet | 787 MPa |
| 0° flex modulus (ASTM Test D-3039) | |
| 23° C., dry | 48.2 GPa |
| 82° C., dry | 47.5 GPa |
| 82° C., wet | 38.5 GPa |
| 93° C., dry | 44.7 GPa |
| 93° C., wet | 35.8 GPa |

As used herein, the term "dry" means that the test was conducted after the sample had been conditioned for 24 hours at 50% relative humidity, while the term "wet" means that the test was conducted after the sample had been exposed to 100% relative humidity at a temperature of about 80° C. until no further weight gain was observed. In the aerospace industry, one commonly accepted criterion allows a 50% reduction of room temperature dry flex strength as acceptable performance in adverse temperature-humidity environments.

EXAMPLE 16

A prepreg was made by repeating Example 15 but substituting, for the glass fiber, graphite tow made up of filaments 8 micrometers in diameter, the tow weighing about 142 g/m². Using the same curing techniques described in Example 15, three types of laminate were prepared, viz., (a) a "unidirectional" laminate of 12 plies in which the fibers in all the plies extended in the same direction, (b) a "quasi-isotropic" laminate of 8 plies in which the fibers in two plies extended at 0° two plies at 45°, two plies at 90°, and two plies at 135° and (c) a "±45°" laminate of 8 plies in which the fibers in four plies extended at 45° and in the other four plies at 135°. When subjected to the same tests described in connection with Example 15 (all tests being run "dry"), the following results were obtained:

| Test | Unidirectional | Quasi-Isotropic | ±45° |
|---|---|---|---|
| 0° flex strength, MPa | | | |
| 22° C., dry | 1,267 | 1,130 | |
| 22° C., wet | 1,242 | | |
| 82° C., dry | 1,205 | | |
| 93° C., dry | 1,034 | | |
| 93° C., wet | 869 | | |
| 104° C. | 861 | 655 | |
| 0° flex modulus, GPa | | | |
| 22° C., dry | 117 | 69 | |
| 82° C., dry | 103 | | |
| 93° C., dry | 89 | | |
| 93° C., wet | 85 | | |
| 104° C. | 83 | | |
| Short beam shear, MPa | | | |
| 22° C. | 76 | 57 | |
| 82° C. | 54 | | |
| 93° C. | 52 | | |
| 104° C. | 39 | 31 | |
| 0° tensile, MPa | | | |
| 22° C. | 1,908 | 606 | 220 |
| 93° C. | | | 158 |
| 104° C. | | 578 | |
| 0° tensile modulus, GPa | | | |
| 22° C. | 144 | 50 | 10 |
| 93° C. | | | 7 |
| 104° C. | | 486 | |

To determine the amount of moisture picked up by products of the invention, several cured laminates were weighed and then placed in 100% humidity at 88° C., weighing the laminates from time to time. Total weight gain was as follows: 24 hours, 0.48%; 48 hours, 0.72%; 200 hours, 0.79%; 500 hours, 0.80%.

EXAMPLE 17

The prepreg-preparation steps of Example 15 were duplicated, substituting, for the glass beam, a 181 style cloth woven from glass yarns. A 14-ply stack of the resultant prepreg was cured in a platen press at about 150° C. under a pressure of 345 KPa for two minutes and then removed and immediately cooled. The cured laminate was found to have the following mechanical properties at 22° C.: flex strength, 620 MPa; flex modulus, 21.4 GPa; short beam shear strength, 45.5 MPa.

The excellent fiber wetting properties of resin systems of the present invention facilitates preparation of polymeric organic fiber prepregs, e.g., those made using aromatic polyamide (aramid) fibers, which were difficult to make using prior art epoxyadhesives. The aramid fiber prepregs, in addition to being less expensive than those made from graphite fiber, provide improved impact and fatigue resistance, as well as excellent vibration damping properties; their moisture and heat resistance, however, are not so good as in prepregs using inorganic fibers. Example 18 describes a prepreg made with aramid fibers.

EXAMPLE 18

The prepreg preparation steps of Example 15 were duplicated, substituting, for the glass beam, 7100-denier aramid yarn (commercially available from E.I. duPont de Nemours & Co. under the registered trademark designation "Kevlar" 49).

Using the same curing techniques described in Example 15, two types of laminate were prepared, viz., (a) a "unidirectional" laminate of 8 plies in which the fibers in all the plies extended in the same direction and (b) a unidirectional laminate of 16 plies in which the fibers in all the plies also extended in the same direction. After cure, both laminates had a resin content of 48%.

When the 8-ply laminate was subjected to the same "dry" tensile test used in Examples 15, and the 16-ply laminate was subjected to a "dry" tensile test in which the stress was applied at 90° to the direction of the fibers, the following results were obtained:

|  | 8-ply | 16-ply |
|---|---|---|
| 0° tensile, MPa |  |  |
| 22° C. | 1,410 |  |
| 0° tensile modulus, GPa |  |  |
| 22° | 69 |  |
| 90° tensile, MPa |  |  |
| 22° C. |  | 32 |
| 83° C. |  | 26 |
| 90° tensile modulus, MPa |  |  |
| 22° C. |  | 3,450 |
| 83° C. |  | 2,690 |

I claim:

1. A heat-curable epoxy resin adhesive having excellent shelf life at 22° C., comprising a blend of
   (a) 100 parts of a viscous oligomeric epoxy resin that is the oligomeric reaction product of bisphenol A and epichlorohydrin,
   (b) 60 to 120 parts of a hardener that is the reaction product of bisphenol A and the monoglycidyl ether of bisphenol A, and
   (c) 0.1 to 5%, based on (a)+(b), of an imidazole reactive hardener and latent cure accelerator,
   said adhesive not only permitting the easy removal of entrapped air during the curing process by applying a vacuum, but also curing rapidly at 100° C., the cured adhesive being extremely tough and resisting deterioration of its mechanical properties when exposed to high temperatures and humidities.

2. The adhesive of claim 1 wherein the epoxy resin has an epoxy equivalent weight of about 170–180.

3. The adhesive of claim 1 wherein the hardener is a mixture of low molecular weight oligomers of the reaction product of bisphenol A and the monoglycidyl ether of bisphenol A.

4. The adhesive of claim 3 wherein the mixture consists essentially of 1–4 moles of reacted bisphenol A-monoglycidyl ether and 1 mole of reacted bisphenol A.

5. The adhesive of claim 3 wherein 70–90 parts of the hardener are employed.

6. A prepreg comprising a sheet product wherein the adhesive of claim 5 is reinforced with fibers.

7. The prepreg of claim 6 wherein the fibers are monofilaments aligned parallel to each other.

8. The prepreg of claim 7 wherein the fibers are graphite fibers.

9. The prepreg of claim 7 wherein the fibers are glass fibers.

10. The prepreg of claim 7 wherein the fibers are polymeric aramid fibers.

11. The prepreg of claim 6 wherein the fibers are in the form of a woven fabric.

12. The prepreg of claim 6 wherein the fibers are in the form of a knitted fabric.

13. The prepreg of claim 6 wherein the fibers are in the form of a nonwoven fabric.

14. The prepreg of claim 13 wherein the fabric is stitch-bonded.

15. A composite formed from a laminated plurality of the prepregs of claim 7.

16. The composite of claim 15 wherein all the fibers extend in the same direction.

17. The composite of claim 15 wherein the fibers in the plies extend at an angle to each other.

18. The heat-cured epoxy resin adhesive of claim 1.

19. The prepreg of claim 6 wherein the adhesive has been heat-cured.

20. The composite of claim 15 wherein the adhesive has been heat-cured.

* * * * *